United States Patent [19]
Jones et al.

[11] Patent Number: 5,491,722
[45] Date of Patent: Feb. 13, 1996

[54] EYE PATTERN MARGIN MEASUREMENT AND RECEIVER STRESS DETECTION DEVICE

[75] Inventors: David E. Jones, Huntsville; Robert E. Gewin, Rogersville; Ronald W. Jackson, Huntsville, all of Ala.

[73] Assignee: Communications Technology Corporation, Dallas, Tex.

[21] Appl. No.: 993,672

[22] Filed: Dec. 21, 1992

[51] Int. Cl.⁶ ..................................................... H04B 3/46
[52] U.S. Cl. ........................ 375/224; 375/226; 375/227; 375/228; 375/349; 324/76.15; 324/76.16; 364/487; 371/5.1; 455/226.3; 455/226.4
[58] Field of Search .............................. 375/10, 101, 224, 375/228, 346, 348, 349; 324/76.15, 76.16; 364/487; 328/162; 371/5.1, 56; 455/226.1, 226.2, 226.3, 226.4

[56] References Cited

U.S. PATENT DOCUMENTS

| | | | |
|---|---|---|---|
| 3,721,959 | 3/1973 | George | 328/162 |
| 4,326,168 | 4/1982 | Acker | 328/162 |
| 4,449,223 | 5/1984 | Liskov et al. | 375/10 |
| 4,475,210 | 10/1984 | Couch | 375/10 |
| 4,633,465 | 12/1986 | Fitch et al. | 375/10 |
| 4,697,265 | 9/1987 | Nozue | 375/10 |
| 5,019,995 | 5/1991 | Saito et al. | 364/487 |
| 5,220,581 | 5/1993 | Ferraiolo et al. | 375/10 |
| 5,333,147 | 7/1994 | Nohara et al. | 375/10 |

OTHER PUBLICATIONS

Nishimoto H., "New Method analyzing eye patterns and its applications to high–speed optical transmission system", May 1988, Journal of Lightwave Technology, vol. 6, Iss. 5, pp. 678–685.

Primary Examiner—Stephen Chin
Assistant Examiner—Amanda T. Le
Attorney, Agent, or Firm—C. A. Phillips

[57] ABSTRACT

A system and method are provided wherein binary communications signals are received, and sequences of values of like types of these, such as positive ones, positive zeroes, negative ones, and negative zeroes, are observed. Responsive to a sequence of like-type signals, a reference potential is driven generally in the direction of value of these signals, and most responsively in the direction of the greatest signal degradation. A reference potential for each type is then stored, and the one of these having the most degraded amplitude is selected, and an indication of the percentile of its degradation is provided.

19 Claims, 6 Drawing Sheets

EYE PATTERN MARGIN MEASUREMENT AND RECEIVER STRESS DETECTION DEVICE

FIELD OF THE INVENTION

This invention relates generally to systems and methods for measuring signal quality, and particularly to a method and circuitry for determining signal quality parameters indicative of quality of a T1 signal communications line.

BACKGROUND OF THE INVENTION

In the telephone system currently in use today, which conveys analog voice and digital data communications, it is necessary to convey a number of channels, each carrying a discrete voice or data communication, over a single twisted pair of conductors or a fiber optic cable. In order to accomplish this, the channels are multiplexed at a frequency depending on the number of channels applied to the pair of conductors. For example, in the instance where a PBX (private branch exchange) is installed in an office building, analog voice communications for each channel are coupled to a PBX switching and multiplexing unit in the building. Here, the signals are digitized by an A/D converter and multiplexed by time division multiplexing, and output to the twisted pair of conductors leading away from the office building as a serial, bipolar data stream at a frequency of about 1.544 Mhz. At this frequency, up to 24 channels may be conveyed on the single pair of conductors, with this frequency and numbers designated as a T1 signal. This T1 signal is routed to a switching station outside the building or to a central office proximate the destination where the discrete 24 channels are demultiplexed and directed to their destination as an analog signal. In the instance where the call is a long distance call, connections are made to an area network, which includes a multiplexer that multiplexes the various channels at a frequency of about 44.736 Mhz, and which will carry the equivalent of 28 multiplexed T1 channels, or 672 discrete channels, over a single pair of conductors. This frequency and number of channels is designated as a T3 signal. This scheme of multiplexing discrete channels at higher frequencies continues to very high data rates which are suitable for overseas communications between continents over fiber optic conductors, and which operates in the gigahertz range to convey over 25,000 channels over a single fiber optic light guide.

The multiplexed T1 signal is applied to the twisted pair transmission line as a wideband bipolar signal having positive and negative pulses, and having a maximum voltage of about 6 volts peak-to-peak, or about 3 volts for each of the positive going and negative going pulses. Frequency content of the signal is over a wide band of frequencies from approximately 500 Khz to greater than 4.5 Mhz, with attenuation from the signal line, which has a characteristic impedance of about 100 ohms, causing attenuation of the signal at a rate of about 20 dB per mile at the Nyquist frequency (one half the bit rate) of approximately 772 Khz, with significantly greater attenuation of the higher frequency signal components and significantly less attenuation of the lower frequency signal components. This necessitates the use of repeater circuitry to regenerate the signal at intervals of about every 6000 to 9000 feet of the twisted pair line, which repeater circuitry serving to receive a nominal signal of about 0.6 volts peak to peak, perform a spectral equalization of the signal, and output the signal at about 6 volts peak to peak.

Figure 1:
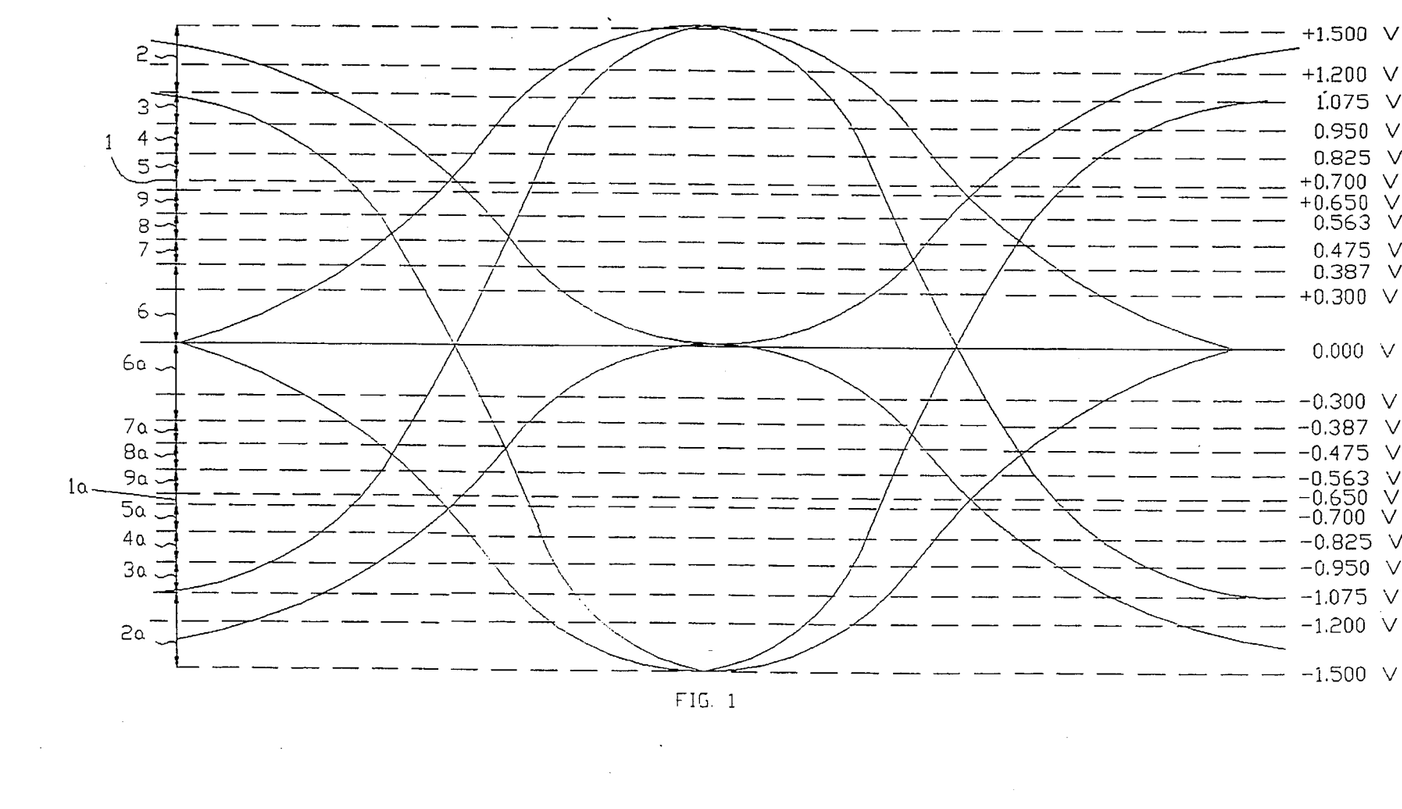
FIGS. 1 and 1a are waveforms of a nominal "eye" pattern and an impaired "eye" pattern, respectively.
Figure 1A:
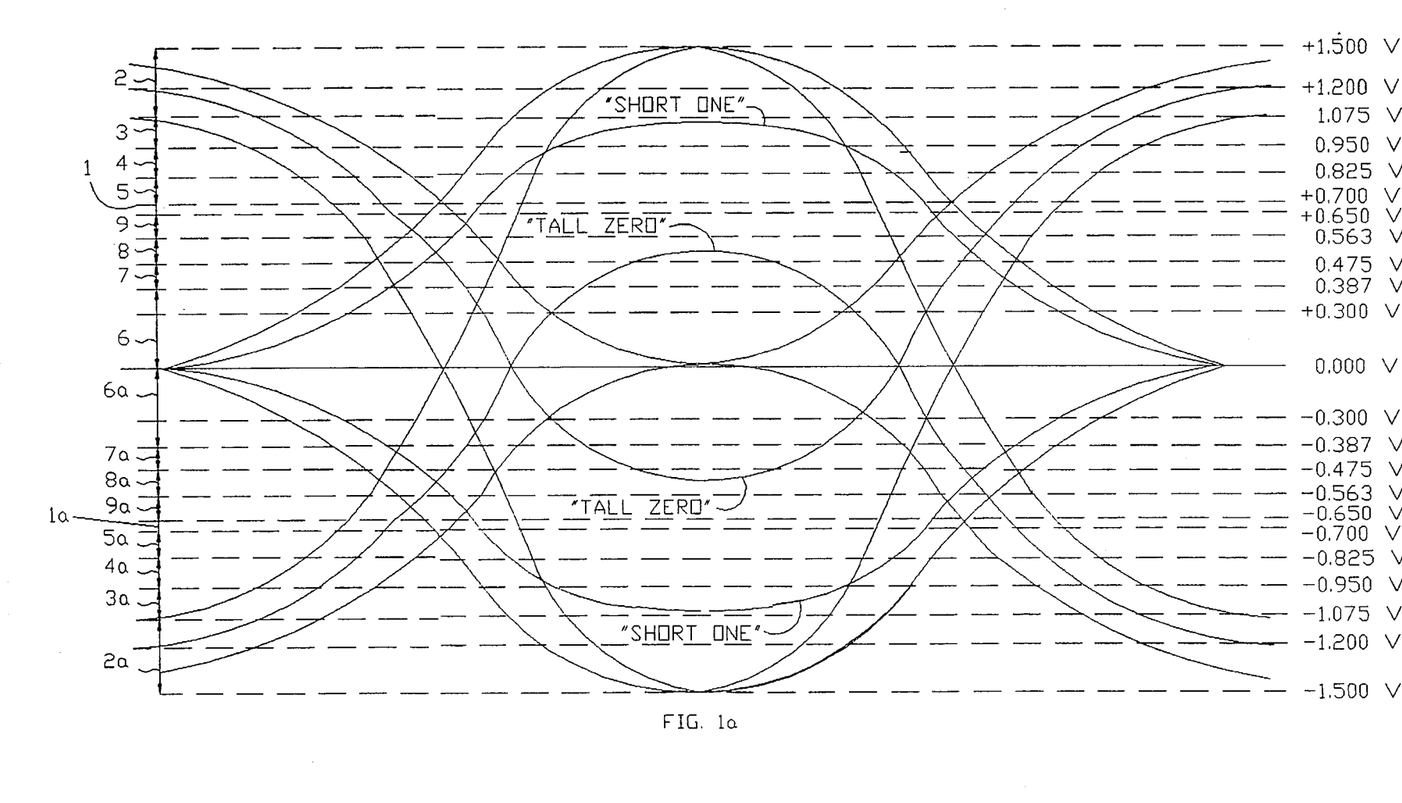

The equalization function consists of a filter which has an inverse attenuation versus frequency transfer function of the twisted pair transmission line; for example, providing 20 dB gain at the 772 Khz Nyquist frequency, greater gain at higher frequencies, and less gain at lower frequencies, resulting in an "equalized", or flat, broadband frequency transfer function through a 6000 foot cable section and equalizing amplifier section of the repeater circuitry. This equalized signal consists of a band limited (for noise reduction) bipolar pulse sequence, the pulses having a uniform amplitude and undistorted sinusoidal wave shape for optimum data detection and clock signal extraction. When a receiver equalizer waveform is observed with an oscilloscope with multiple traces of different pseudorandom data sequences overlayed, there appears a distinctive "eye" pattern which is indicative of a properly designed equalizer operating at optimum fidelity with an unimpaired transmission line to produce maximum signal margins for the receiver data detector. These margins are disposed both above and below voltage thresholds at positive and negative 650 millivolts and positive and negative 700 millivolts dividing ZERO and ONE logic levels, respectively, as shown in FIG. 1. In contrast, FIG. 1a shows "eye" pattern distortion wherein ONE logic levels are degraded to a point where they are less than nominal amplitude but extend above or below the positive and negative 700 millivolt thresholds, as indicated by the "SHORT ONE" designation. Likewise, ZERO logic levels which are below the 650 millivolt thresholds but are greater than nominal ZERO amplitudes are indicated by the "TALL ZERO" designation.

Generally, this system works well, but there are a number of factors that can cause the signal to be degraded to a point where receiving circuitry may not be able to recover the bipolar signals, or may only be able to recover a portion of the signals. For instance, when water leaks into a cable housing a number of twisted pair communication lines, the signal is attenuated to a greater extent and may be degraded to an unusable level. In the instance where one of the twisted pairs is broken and the two broken ends are touching, or a grounded conductor is just touching one or both of the twisted pair conductors, the signal may be intermittently propagated depending on thermal expansion or contraction of the cable. In this instance, the signal may only marginally possess sufficient energy to be regenerated. Additionally, other signal lines inadvertently spliced in parallel with a T1 span cause disruptions to the signal by causing signal reflection and impedance mismatches. Further, induced current into the signal lines may cause an offset in D.C. potential of the signal, causing the T1 signal to ride on the offset D.C. potential. In instances of the aforementioned problems, and with other physical problems with the signal line, distortion of the transmitted signal is caused. This distortion may severely degrade margins of the received signals, but only cause detectable receiver data errors intermittently depending on the magnitude and frequency of interfering noise sources. An impaired circuit may show no errors in the absence of interfering noise, while the same impaired circuit displays detectable errors in a high noise environment. In these instances where noise causes impairment in the signal line, fault isolation generally requires taking the line out of service, and performing a Bit Error Rate Test (BERT) and Time Domain Reflectometer (TDR) test to detect and isolate the impaired span of transmission line. This results in significant "down time" during which customer service is interrupted. Also, many marginal conditions are never detected until changing noise environments degrade margins of the T1 signal to levels that have deleterious effects on the data carried thereby.

In accordance with the foregoing, it is an object of this invention to provide a method and system for detecting degree of impairment of a signal line without taking the line out of service, and for displaying such impairment in terms of a percentile of line impairment.

SUMMARY OF THE INVENTION

A system for monitoring communications signals is constructed having signal discrimination means which receives the communications signals and provides as an output at least one type of signal making up the communications signal. This output is provided to a degraded signal detector, which generates a variable reference signal which is driven to a level indicative of degraded signals of the type of signal output by the discrimination means. Reference comparison means are provided for comparing the reference signal to a nominal signal potential and provide an output representative of degree of impairment of the communications signal.

DETAILED DESCRIPTION OF THE PREFERRED EMBODIMENT

In order to determine margins of the T1 signals and infer line quality therefrom, it is necessary to observe at least four impairment parameters; (1) minimum amplitude positive ONE, (2) minimum amplitude negative ONE (3) maximum amplitude positive ZERO, and (4) maximum amplitude negative ZERO. These impairment parameters are readings indicating uniformity or lack of uniformity of the equalized T1 signal, which is in turn indicative of condition of the T1 line. Maximum amplitudes of ONES signals and minimum amplitudes of ZERO signals are not observed, because such information is not necessary for computation of "eye" pattern margin degradation.

Ideally, in an equalized T1 signal having a nominal bipolar peak-to-peak amplitude of about 3.0 volts, a positive-going T1 pulse of about 1.5 volts will cross a +700 millivolt switching threshold for a positive ONE and extend thereabove about 800 millivolts, and a negative-going T1 pulse of about −1.5 volts will cross a −700 millivolt switching threshold for a negative ONE and extend about 800 millivolts therebelow. However, for a number of reasons as described, amplitude of pulses of the T1 signal may fluctuate slightly, or the signal applied to the line from a transmitter may be slightly lower than a nominal value, resulting in a good signal with slightly lower signal amplitude. Thus, for purposes of the instant invention, and in addition to calculating an actual percentage of line impairment, discrete categories of line impairment are found based upon reductions in amplitude of positive and negative ONE signals, and increases in amplitude of ZERO signals.

In the instance where a line is considered to be good, and referring to the waveforms of FIG. 1, minimum amplitudes of positive going pulses which exceed the +700 millivolt switching threshold 1 by a margin 2 extending from about +1.075 volts to +1.5 volts generates an indication that the line is minimally impaired, which is on the order of between 0 and 25% impairment. This is a representation that nominal margins have been degraded by 25% or less. Positive ONE pulses having minimum amplitudes extending into margin 3 between about +0.950 volts to +1.075 volts generate an indication that the line has minor impairment, which impairment being between 25% and 50%. Positive ONE pulses having minimum amplitudes extending into margin 4 from about +0.825 volts to about +0.950 volts generates an indication that the line has moderate impairment corresponding to 50% to 75% impairment. Where a line is impaired such that minimum amplitudes of positive ONES extends into a margin 5 from about 0.700 volts to about 0.825 volts, a message is generated indicating major, or 75% to 100% impairment of the signal line.

As also shown in the waveforms of FIG. 1, negative polarity margins for minimum amplitudes of equalized negative polarity T1 pulses have like amplitude values of negative polarity as for the aforementioned positive polarity margins. Accordingly, minimum amplitudes of equalized negative polarity T1 pulses extending into margin 2a generate an indication of minimal impairment (0%–25%), those extending into margin 3a generate an indication of minor impairment (25%–50%), those extending into margin 4a generate an indication of moderate impairment (50%–75%), and those extending into margin 5a generate an indication of major impairment (75%–100%).

In a like manner, maximum amplitudes of equalized, positive polarity T1 ZERO signals are used to determine categories of impairment for these positive ZERO signals. Again referring to FIG. 1, a maximum positive ZERO signal falling to a margin 6 between about 0.0 volts and +387 millivolts generates an indication of minimal, or 0 to 25% impairment, and a maximum positive ZERO signal falling into margin 7 between +387 millivolts and +475 millivolts generates an indication of minor, or 25% to 50% impairment. Equalized maximum amplitudes of positive polarity T1 signals falling to a margin 8 between +475 millivolts and +563 millivolts generate an indication of moderate, or 50% to 75% impairment, and maximum amplitudes of equalized T1 signals falling to a margin 9 between +563 millivolts and +650 millivolts generate an indication of major, or 75% to 100% impairment.

Likewise, maximum amplitudes of equalized, negative polarity T1 ZERO signals are used to determine categories of impairment for maximum negative ZERO signals. Values of the negative polarity margins are the same as the values for the positive polarity margins, with the exception that the voltages are negative values. As such, maximum negative ZERO signals falling into margin 6a (FIG. 1) generates an indication of minimal line impairment (0%–25%), maximum negative ZERO signals falling into margin 7a generate an indication of minor impairment (25%–50%), maximum negative ZERO signals falling into margin 8a generate an indication of moderate impairment (50%–75%), and ZERO signals falling into margin 9a generate an indication of major impairment (75%–100%).

Figure 2:
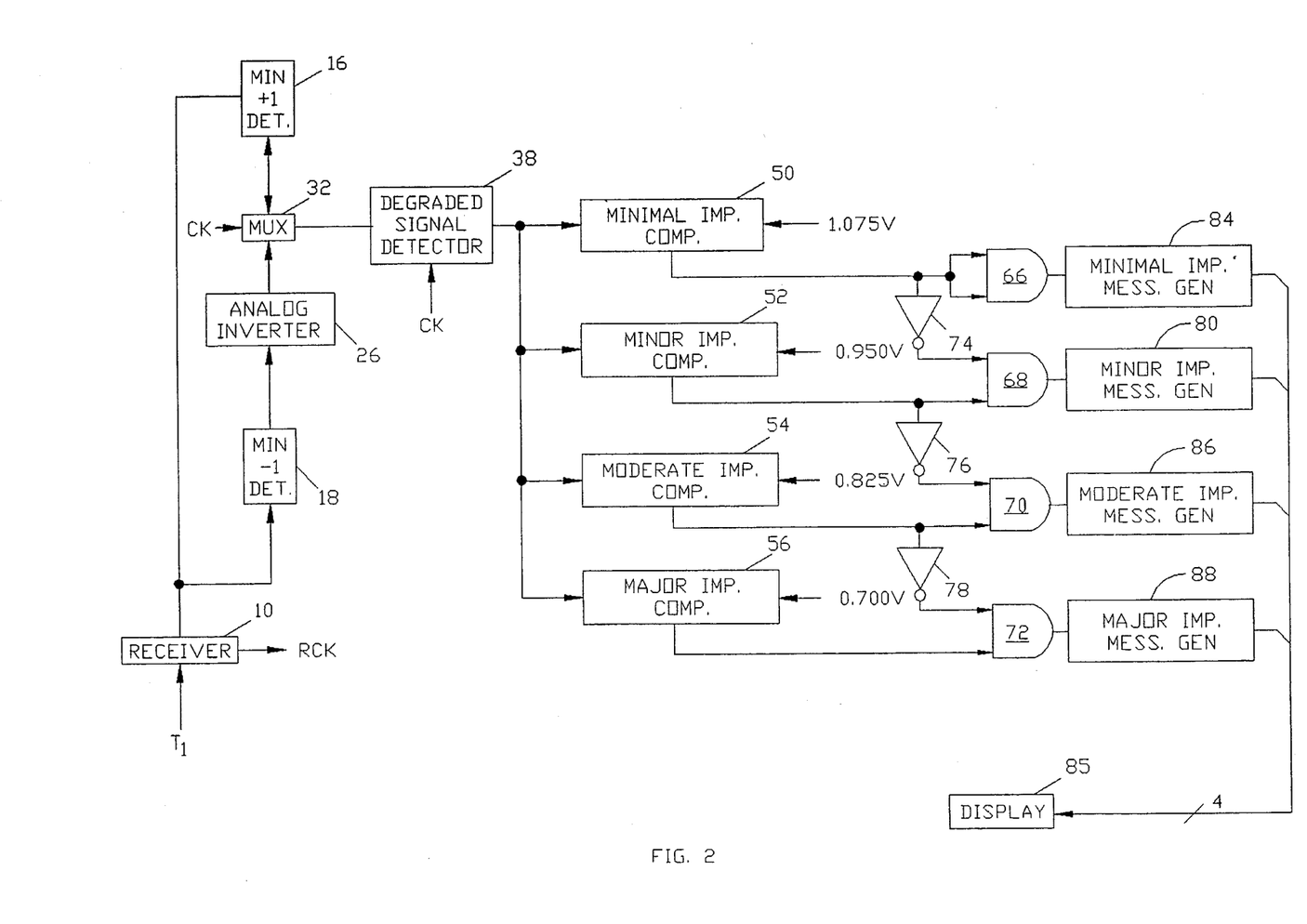
FIGS. 2 and 3 are block diagrams of the present invention.
Figure 3:
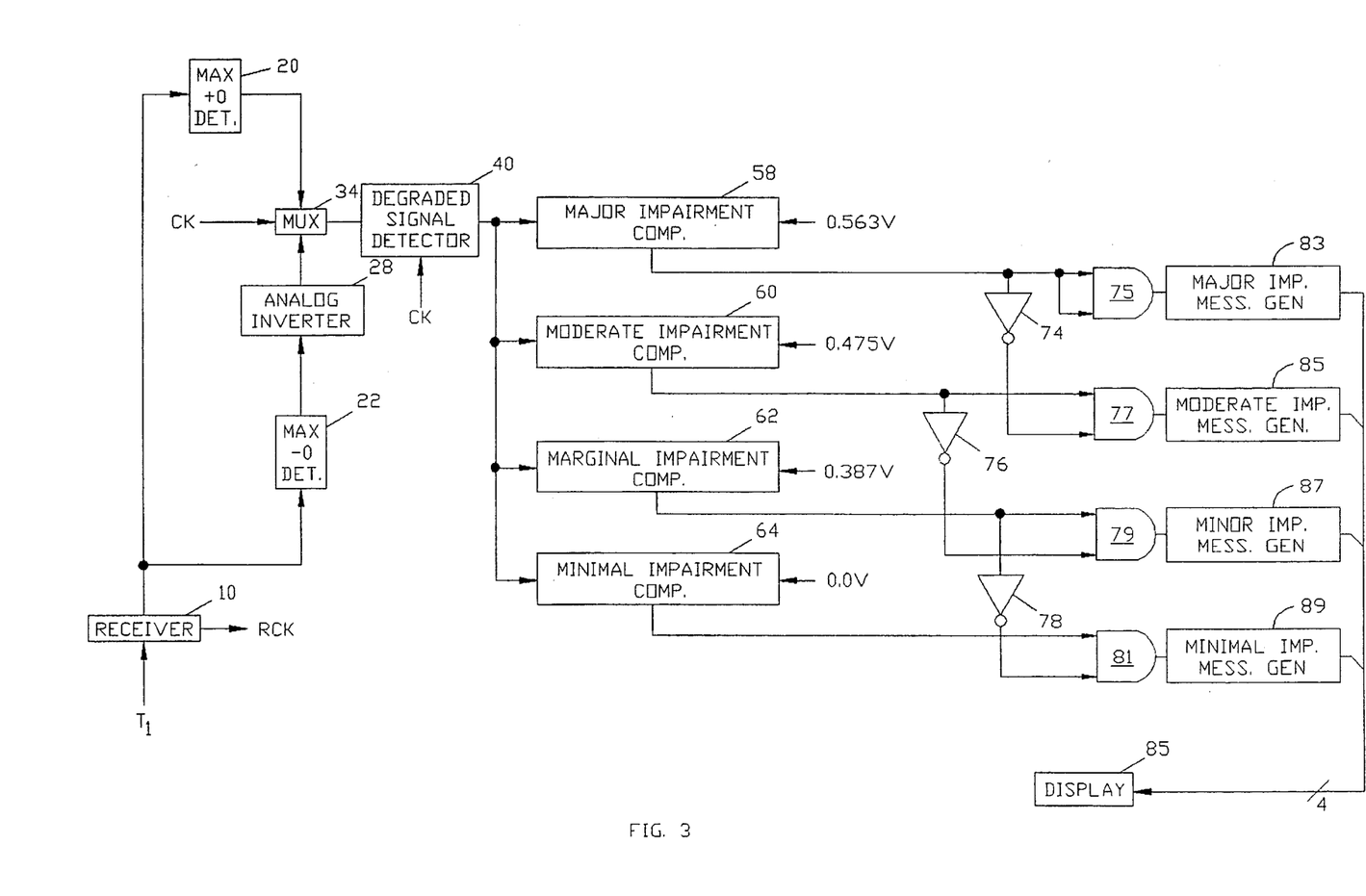

In the broadest concept of the present invention as illustrated in FIGS. 2 and 3, which illustrate generalized functional block diagrams of the present invention, a system is shown wherein particular conditions of a T1 communications signal are used to generate indications of degree of impairment of a T1 twisted pair communications line conveying the T1 signal. Initially, the T1 signal is input to a receiver 10, which equalizes the T1 signal by imposing a gain verses frequency transfer function which is the inverse of the transmission line frequency response, as described above. This is done by an integrated circuit conventional to the telecommunications industry, an XR-T56L22 and ancillary components configured as an automatic line buildout circuit (ALBO), which simulates 0 feet to 9500 feet of twisted pair transmission line, followed by a fixed 9500 foot equalizer, also conventional to the art. These components serve to receive the T1 signal from any particular length of the twisted-pair communications cable, sense the length of cable from the last repeater, and provide selected attenuation thereto such that the T1 signal appears to have been received through about 9500 feet of cable. After equalization, the equalized T1 signal has a uniform peak-to-peak amplitude of from about 2.4 volts to 3.0 volts, with positive and negative ONE signal levels of from about 1.2 to 1.5 volts each. Such a nominal signal, along with nominal ZERO signal levels, is illustrated in FIG. 1, which for convenience of illustration, shows positive and negative ONE pulses and ZERO signal levels superimposed to form an "eye" pattern consisting of positive ONES, negative ONES, positive ZEROES, and negative ZEROES. In accordance with thresholds in the XR-T56L22 integrated circuit, and as described, potentials representing these signal levels are divided into four regions, with potentials above about +700 millivolts being a positive ONE, potentials between about +650 millivolts and 0 millivolts being a positive ZERO, potentials between zero and about −650 millivolts being a negative ZERO, and any voltage below about −700 millivolts being a negative ONE. The difference of 50 millivolts between positive and negative ONE and ZERO thresholds is a guard band region of uncertainty. Thus, thresholds at +650 millivolts and +700 millivolts are established for determining whether a particular positive going pulse is interpreted as a ONE or a ZERO, with like potentials of opposite polarity for interpreting negative pulses. As stated in the foregoing, marginal positive and negative pulses representative of ONE signal levels having amplitudes just sufficient to cross the positive and negative thresholds may be determined to be caused by impairments of the signal line, with the margin by which the positive and negative ONES cross these thresholds being indicative of extent of such impairments. Additionally, as stated, noise in the transmission line may cause a ZERO signal potential to be increased in amplitude to a positive or negative amplitude which approaches the positive or negative 650 millivolt switching thresholds, also indicative of line impairment.

The receiver 10 also recovers a clock signal RCK and active LOW clock related signals RD POS and RD NEG from the T1 signal. RCK is the clock signal used to clock components of the system, with a rising edge of the clock pulse occurring about in the center of a discrete T1 signal. RD POS and RD NEG serve to indicate occurrence of positive and negative T1 pulses, as will be further described.

As stated, the equalized T1 pulses from receiver 10 (FIG. 2) are applied to minimum positive and negative ONES detectors 16 and 18, respectively, and maximum positive and negative ZERO detectors 20 and 22, respectively, (FIG. 3). Due to the fact that magnitude of the switching thresholds are identical for both positive and negative signals, and as illustrated herein by way of example, the negative signals are inverted by analog inverters 26 and 28 to a positive representation of the negative portion of the signal so that the simplified schematic circuit may sample both positive and negative polarities of the T1 signal. The equalized positive signals and equalized positive representations of the negative signals are applied to multiplexers 32 and 34, which alternately apply one or the other of the aforementioned signals to degraded signal detector circuits 38 and 40 responsive to a clock signal. Circuits 38 and 40 serve to weigh measurements of a particular type of T1 signal, such as positive or negative ONES or ZEROES, toward a particular aspect of the type of signal being measured, such as minimum amplitudes or maximum amplitudes of the T1 signals. A weighted value for each type of measurement is applied to one input of a plurality of comparators 50–64. Comparators 50–64 are of the type where a reference voltage is applied to a reference input thereof, with an input voltage applied to the other input. The output of the comparator remains at a LOW logic state as long as the input voltage is below the reference voltage, and when the input voltage rises above the reference voltage, the output of the comparator is switched to a HIGH logic state.

In the instance where minimum levels of positive and negative ONES signals are observed (FIG. 2), a reference voltage of +1.075 volts is applied to comparator 50, this reference defining positive margin 2 and negative margin 2a (FIG. 1) for minimum amplitudes of ONES portions of the T1 signal. Thus, a T1 pulse having an amplitude greater than 1.075 volts in positive or negative directions indicates minimal impairment, or from 0% to 25% impairment, of the signal line. Similarly, a reference of + 0.950 volts is applied to comparator 52, this reference establishing positive margin 3 and negative margin 3a between +0.950 and +1.075 volts corresponding to between 25% and 50% impairment, or minor impairment of the T1 line. The reference of +0.825 volts applied to comparator 54 defines positive margin 4 and negative margin 4a between 0.825 and 0.950 volts into which a minimum value of ONES pulses extends indicates between 50% and 75% impairment, or moderate impairment of the T1 line. The reference of +0.700 volts applied to comparator 56 defines positive margin 5 and negative margin 5a between +0.700 and +0.825 volts into which a T1 signal extends indicates between 75% and 100% impairment, or major impairment of the T1 signal line.

The outputs of these comparators are supplied to logic circuits which in turn activate one of four message generators 84, 80, 86, and 88 that provide messages that indicate categories of MINIMAL IMPAIRMENT, MINOR IMPAIRMENT, MODERATE IMPAIRMENT, or MAJOR IMPAIRMENT, respectively, with the generated message being applied to a display 85. The logic circuits, in this broadest concept, comprise AND gates 66, 68, 70, and 72, which each have one input coupled to a discrete output of the comparators, with AND gate 66 having both inputs coupled to the output of comparator 50. An inverter 74 inverts the output of comparator 50 and provides the inverted signal to the other input of AND gate 68, with inverters 76 and 78 similarly coupled as shown between outputs of comparators 52 and 54 and inputs of AND gates 70 and 72, respectively. Coupled as such, only one message will be generated by one of the message generators to be displayed on display 82, as illustrated by a signal having an amplitude between either positive or negative 0.950 and 1.075 volts, this causing a logical LOW output from comparator 50 and logical HIGH outputs from comparators 52, 54, and 56, which outputs being applied to AND gates 68, 70, and 72, respectively. However, inverters 76 and 78 inhibit gates 70 and 72 by inverting the logical HIGHS applied thereto to LOWS, while gate 68 is enabled by the HIGH from comparator 52 and the HIGH from inverter 74. Of course, gate 66 is inhibited by the LOW from comparator 50. Thus, only AND gate 68 is enabled to provide a HIGH to message generator 80, which generates a message of MINOR IMPAIRMENT that is displayed on display 85.

In the instance where a maximum amplitude of ZERO T1 signal levels are observed to obtain an indication of line impairment, and referring to FIG. 3, receiver 10 receives the T1 signal, equalizes the signal, recovers the clock signal RCK as described, and applies the equalized signal to maximum positive ZERO detector 20 and maximum negative ZERO detector 22. Detectors 20 and 22 each detect a maximum amplitude of ZERO signal levels of the equalized T1 signal, and provide these maximum ZERO signals as an output. Detector 22 provides its detected maximum negative ZERO signals to an analog inverter 28, which in turn applies the maximum negative ZERO signals as a positive representation to multiplexer 34. Detector 20, providing positive maximum ZERO signals, applies such signals directly to multiplexer 34, which as stated, alternately applies the maximum positive ZERO signals and the maximum negative ZERO signals to weighing circuit 40. Circuit 40 applies a weighted value of either the maximum positive or negative ZERO signals as an input to each of comparators 58, 60, 62, and 64. Coupled to reference inputs of comparators 58, 60, 62, and 64 are voltages of +0.563 volts, +0.475 volts, +0.387 volts, and 0.0 volts, respectively. As such, a positive or negative ZERO having an amplitude of between 0.0 and 0.387 volts, corresponding to 0% to 25% impairment, causes the output of comparator 64 to be switched HIGH, a ZERO having an amplitude of between +0.387 volts and +0.475 volts, corresponding to between 25% and 50% impairment, switches outputs of comparators 64 and 62 HIGH, a ZERO having an amplitude of between +0.475 volts and +0.563 volts, corresponding to between 50% and 75% impairment, switches outputs of comparators 64, 62, and 60 HIGH, and a ZERO over +0.563 volts, corresponding to impairment over 75% switches outputs from all of comparators 64, 62, 60, and 58 HIGH. Outputs from each of these comparators are discretely applied to one input of a respective AND gate of AND gates 75, 77, 79, and 81. A first inverter 78 is coupled between the output of comparator 62 and an input of AND gate 81, a second inverter 76 is coupled between the output of comparator 60 and AND gate 79, and a third inverter 74 is coupled between the output of comparator 58 and AND gate 77. Each of AND gates 75, 77, 79, and 81 are separately coupled to message generators 83, 85, 87, and 89, which generate messages of MAJOR IMPAIRMENT, MODERATE IMPAIRMENT, MINOR IMPAIRMENT, and MINIMAL IMPAIRMENT, respectively, which in turn are coupled to display 85. Operation is as described above, with only one of AND gates 75, 77, 79, and 81 being gated to pass an enabling signal to the respective message generator to produce a message indicative of line impairment, which is in turn displayed on display 85.

Figure 4:
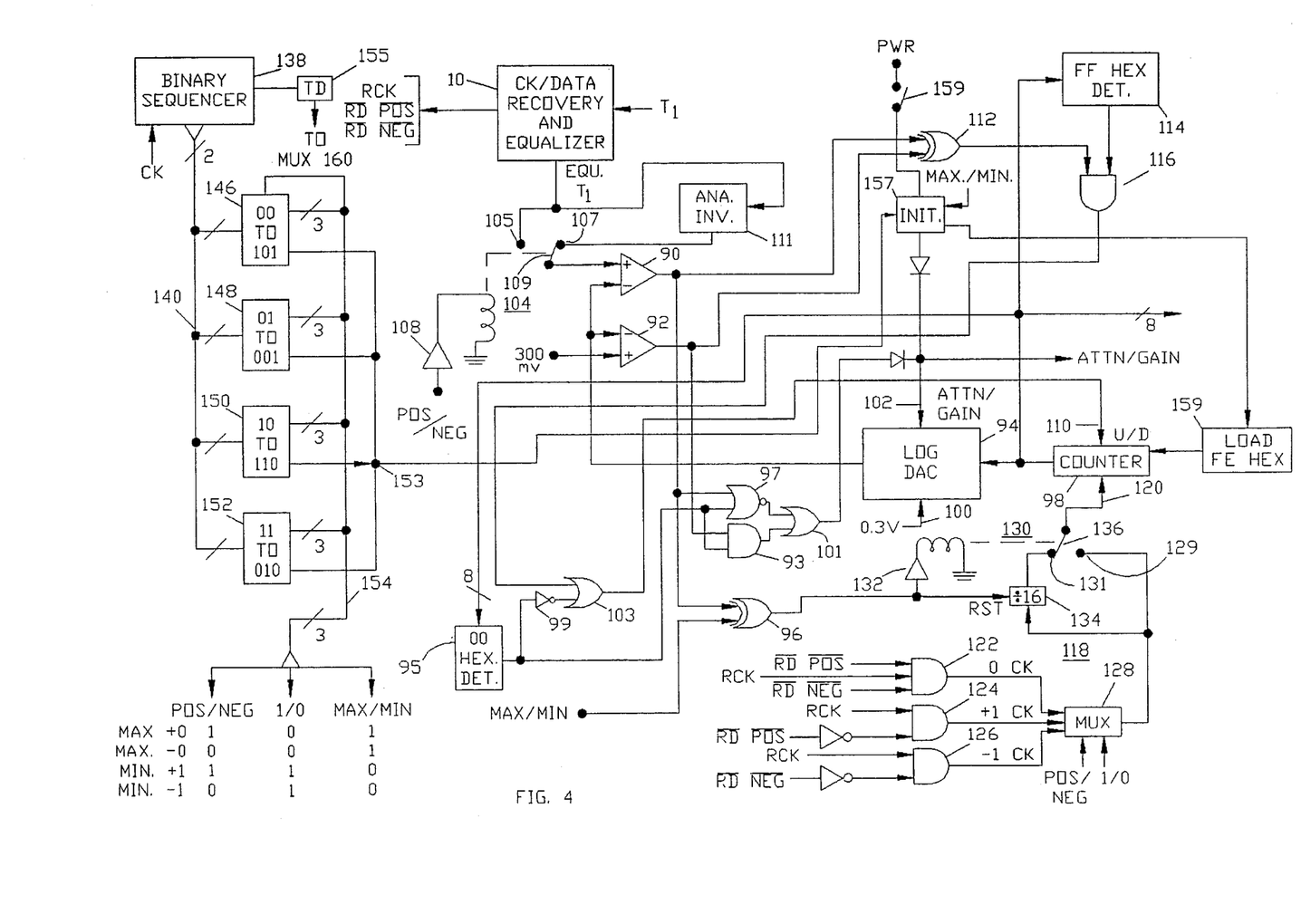
FIG. 4 is a partial schematic, partial block diagram of a detailed embodiment of the invention.

More specifically, and referring to the waveform of FIG. 1 and the system of FIG. 4, the system contemplated by the present invention utilizes a logarithmic digital-to-analog converter (DAC) 94. This DAC is a conventional logarithmic converter, such as part number ML2003 and obtainable from MICROLINEAR CORPORATION of San Jose, Calif., and to which a binary count is applied from counter 98. This count is generated by control circuitry configurable to sequentially facilitate measurement of the four described impairment parameters in the T1 signal, which as described, are minimum amplitude of positive and negative ONES and maximum amplitude of positive and negative ZEROES. The count from counter 98 is applied to DAC 94, causing a reference signal output therefrom to be stepped in discrete steps upward or downward to closely track amplitude of the most impaired T1 signals. After the reference signal from DAC 94 matches an amplitude of the impairment parameter being observed, the reference signal voltage is dithered at that amplitude until stored, and after voltages indicative of all parameters have been stored, an indication of the highest percentile of impairment and highest category of impairment is provided, with these percentiles and categories being continuously updated to show changes of impairment of the transmission line as they occur.

Converter 94 is provided with a plurality of parallel inputs to which a parallel digital signal of from 00 hex to FF hex is applied from counter 98. A precise reference voltage of +300 millivolts is applied to a reference input 100, and an ATTENUATE/GAIN input 102 receives a ONE or ZERO digital logic level. With a ONE applied to input 102 and a sequentially decreasing binary count from counter 98 beginning at FF hex, which corresponds to a reference signal output from DAC 94 of 18.9 millivolts, or 24 dB attenuation of the 300 millivolt reference voltage applied to input 100, the 18.9 millivolt reference output is incremented a 0.1 dB step per count up to 0 dB, which corresponds to a count of 00 hex and a reference signal output from DAC 94 of 300 millivolts. When a ZERO logic level is applied to input 102, the same downward count beginning at FF hex steps the reference signal downward from 4.7547 volts (+24 dB gain of the 300 millivolt reference voltage applied to input 100) at a rate of 0.1 dB per step to 300 millivolts, which again corresponds to a count of 00 hex and 0 dB gain of the 300 millivolt reference voltage. Of course, an upward count either increases or decreases the attenuation or gain factor of the 300 millivolt reference voltage depending on whether a ONE or ZERO, respectively, is applied to input 102. As each 17th count generates a repetitive attenuation level as the 16th count, the output of DAC 94 is not exactly logarithmic; however, this may be ignored. Using this particular DAC, and with the reference potential selected to be 0.3 volts as described, a high degree of resolution is achieved at low signal levels to distinguish the signal from any noise floor that may be present, yet has sufficient resolution at higher voltages to adequately determine higher amplitude parameters of the equalized T1 signals. While the invention herein is described with respect to particular components, such as DAC 94, it is noted that other components and schemes, whether in hardware or software form, may be used to adequately implement this invention.

For stepping the reference signal to an amplitude of a selected parameter of a particular type of equalized T1 signal, and as will be further explained hereinafter, the reference signal from DAC 94 is stepped upward or downward about 16 times faster in one direction than in an opposite direction in order to cause it to quickly seek a T1 impairment parameter of interest, while retarding stepping of the reference signal in the opposite direction when T1 signals occur having less degraded signal levels than a degraded level of the reference signal. For example, in the instance where maximum amplitudes of positive ZEROES are measured, as long as equalized T1 ZERO signals are more degraded, i.e. at a higher amplitude than the reference signal, the reference signal is stepped in discrete 0.1 dB steps upward, one step per occurrence of a positive ZERO, until the reference signal is at an amplitude similar to amplitudes of the highest ZERO T1 signals. At this point, if amplitude of the equalized T1 positive ZERO signals drops, as would occur if a noise source applied to the signal line were eliminated, up to 16 equalized T1 ZERO levels are allowed to pass before the reference output is decremented by one 0.1 dB step. If the reference voltage is still above the equalized T1 ZERO signal after being allowed to drop by 0.1 dB, 16 more lower-in-amplitude T1 ZERO signals are allowed to pass before the reference voltage is again stepped down a 0.1 dB step. In effect, a measurement of impairment is made which is weighted toward the aspect of the signal indicative of impairment, such as a maximum amplitude of ZERO signals and minimum amplitude of ONES signals, while being only selectively responsive to lower amplitude ZERO signals and higher amplitude ONES signals. Additionally, this technique provides buffering against minor signal fluctuations that would otherwise cause the reference output to fluctuate with practically every clock pulse. While a decay step factor of 1:16 is set forth in a preferred embodiment of the invention, it is to be noted that other ratios between fast and slow excursions of the reference signal are workable to provide weighted measurement and a buffering effect against signal fluctuations of the parameter being measured.

Turning now to a more detailed description of the present invention, and for providing information such that the reference signal output from DAC 94 is stepped to match amplitude of the received T1 signal of interest, attention is directed to FIG. 4, wherein the T1 signal is applied to receiver 10. Receiver 10 conventionally recovers the T1 bipolar data, equalizes it to a maximum peak-to-peak signal of about 3.0 volts as described, and recovers a clock signal RCK and associated active LOW signals RD POS and RD NEG. The T1 signal, consisting of positive polarity and negative polarity ONES pulses and positive and negative polarity ZERO signal levels, is coupled to contact 105 and to analog inverter 111, which in turn inverts the T1 signal so that negative polarity T1 signals are converted to to positive polarity representations thereof. This inverted T1 signal is applied to contact 107. Contacts 107 and 105 are alternately connected to the circuit of FIG. 4 by relay arm 109, in turn responsive to relay 104 being energized or deenergized by buffer amplifier 108. Amplifier 108 is energized by a control bit POS/NEG being switched HIGH, and deenergized by POS/NEG being switched LOW, as will be described. Relay 104 may be a conventional relay, or a solid state switching device disposed to function as a relay.

The T1 signals and inverted representations of the T1 signals from relay arm 109 are applied to the non-inverting input of comparator 90. The inverting input of comparator 90 is coupled to the reference signal output from DAC 94, meaning that the output of comparator 90 develops a HIGH when the received T1 signal is greater than the reference signal from DAC 94. At comparator 92, the inverting input is coupled to the reference signal from DAC 94, and the noninverting input is coupled to the 300 millivolt reference voltage applied to reference input 100 of DAC 94. As such, comparator 92 develops a HIGH when the reference signal from DAC 94 is less than the 300 millivolt reference voltage. The output from comparator 92 is indicative of a crossing point between the ATTENUATION mode of operation and the GAIN mode of operation of DAC 94 wherein the bit state applied to ATTENUATE/GAIN input 102 of DAC 94 and the direction of the count from counter 98 both must be reversed as the reference signal traverses this crossing point.

The output from comparator 92 is applied to AND gate 93, with the other input of AND gate 93 taken from 00 hex detector 95. Detector 95 develops a LOW when a count from counter 98 reaches 00 hex. As such, AND gate 93 develops a HIGH and applies this HIGH to one input of OR gate 101 when the count from counter 98 is not at 00 hex and when the reference signal from DAC 94 is less than 300 millivolts, indicating ATTENUATION mode of operation of DAC 94. The output from comparator 90 is applied to one input of NOR gate 97, with the other input to NOR gate 97 taken from 00 hex detector 95. Here, NOR gate 97 develops a HIGH when the count from counter 98 reaches 00 hex and when the equalized T1 signal is less than the reference signal, with this HIGH output provided to one input of OR gate 101. The output of OR gate 101 is coupled via a blocking diode, which blocks an initialization signal from reaching OR gate 101 during initialization of the circuitry to ATTENUATE/GAIN input 102 of DAC 94, and controls whether the DAC is in the attenuate mode or the GAIN mode, as will be further described.

The outputs of comparators 90 and 92 are also coupled to an X-OR (exclusive-or) gate 112, which provides a HIGH only when one or the other of comparators 90 and 92 are HIGH. This output from XOR gate 112 is applied to one input of AND gate 116, with the other input taken from FF hex detector 114. Detector 114 develops a LOW when a count of FF hex from counter 98 is detected. As such, AND gate 116 applies a HIGH to one input of OR gate 103 when either the reference signal is higher than the T1 signal and DAC 94 is in the attenuate mode, or when the reference signal is lower than the T1 signal and DAC 94 is in the GAIN mode, and when the count is not at FF hex. The output of OR gate 103 is coupled to the UP/DOWN input 110 of counter 98, and when HIGH, causes counter 98 to count up, and when LOW, causes counter 98 to count down.

The output of AND gate 116 functions to prevent counter 98 from recycling, or rolling over, from FF hex to 00 hex when counter 98 is counting up and a 0 is applied to input 102 of DAC 94, these conditions being such as to increase amplitude of the reference signal. Here, gate 116 receives an output from FF hex detector 114, which provides a logical LOW when FF hex is detected, with this LOW applied to one input of AND gate 116. As stated, the other input of AND gate 116 is coupled to the output of X-OR gate 112, so that if the T1 signal is at an excessive voltage level above 4.75 volts, with comparator 90 outputting a HIGH and comparator 92 outputting a LOW, which attempts to drive counter 98 past FF hex, detector 114 detects the count of FF hex and disables AND gate 116, applying a LOW to one input of OR gate 103. As the other input of gate 103 can only be a HIGH when a count of 00 is detected, a LOW from gate 116 also disables OR gate 103, applying a LOW to UP/DOWN input 110, in turn causing the next count of counter 98 to count down to FE hex. As the count of FE hex applied to detector 114 changes the output from FF hex detector 114 to again go HIGH, AND gate 116 is enabled to apply a HIGH to the one input of OR gate 103, enabling gate 103 and applying a HIGH to UP/DOWN input 110, causing the counter to count up to FF hex. This process continues as such to dither the count between FE hex and FF hex until the overvoltage condition of the T1 signal is removed. Likewise, with an undervoltage condition occurring when the reference signal is driven to seek a T1 signal lower than 18.9 millivolts, equivalent to −24 dB at a count of FF hex, the lowest attenuation step the circuit is capable of measuring, comparator 90 outputs a LOW and comparator 92 outputs a HIGH, also tending to drive the counter to roll over from FF hex to 00 hex. Here, the count is dithered as described to prevent the count from counter 98 from rolling over to 00 hex until the undervoltage condition is removed.

Control of clocking of counter 98 is achieved by clocking circuitry 118, which provides a positive-going clock transition to clock input 120 of counter 98. This clock signal is obtained, as stated, from receiver 10, which recovers from the T1 signal a combination of RCK, which is the recovered clock signal, RD POS, and RD NEG. RD POS and RD NEG are active LOW signals, and each provides a falling edge transition synchronous with the rising edge of RCK during positive and negative T1 pulses, respectively, and return HIGH with the falling edge of RCK. As stated, RCK occurs about in the middle of the T1 pulses during peak amplitudes thereof so as to be nonresponsive to signal overshoot and undershoot that may occur at rising and falling edges of the equalized T1 signal. During ZERO T1 signal levels, RD POS and RD NEG remain HIGH.

For providing a clock pulse during occurrence of a T1 ZERO logic level, the clock signal RCK and associated signals RD POS and RD NEG are applied to AND gate 122. As such, gate 122 gates RCK pulses as they occur during ZERO logic levels of the T1 signal. For providing a clock pulse during a positive T1 pulse, RCK and inverted RD POS, which now goes HIGH during occurance of RCK during a positive T1 pulse, are coupled to inputs of AND gate 124, which gates RCK during a positive T1 pulse. Likewise, signals RCK and inverted RD NEG, which now goes HIGH during a negative T1 pulse, are coupled to inputs of AND gate 126, which gates RCK during a negative T1 pulse. The RCK pulses from gates 122, 124, and 126, if combined, would form a contiguous stream of RCK pulses, are applied to multiplexer 128, which selectively passes clock pulses only during positive ONE, negative ONE, or ZERO T1 signal levels, as determined by control inputs POS/NEG and 1/0. For example, in the instance where ZERO signal levels are being measured, only RCK pulses occurring during ZERO logic levels are passed by multiplexer 128.

The output of multiplexer 128 is applied to contact 129 of relay 130 and to divide-by-16 circuit 134. Circuit 134 is configured such that when the output of XOR gate 96 is LOW, circuit 134 is held in a reset state, and when gate 96 develops a HIGH output, the reset state is released, enabling divide-by-16 circuit 134 to begin counting The output of circuit 134 is in turn applied to contact 131 of relay 130, which when energized by buffer 132, moves relay arm 136 to the position shown, dividing the number of clock pulses from multiplexer 128 by 16 and applying one of every 16 RCK pulses to input 120 of counter 98. When deenergized, arm 136 is moved to make contact with contact 129, applying all the clock pulses supplied by multiplexer 128 to input 120. An energizing signal to energize relay 130 via buffer 132 is provided by XOR gate 96. Gate 96 receives one input from comparator 90, and the other input from a control bit MAX/MIN. As such, XOR gate 96 develops a HIGH when either the MAX/MIN bit is set HIGH and the equalized T1 signal is lower than the reference signal from DAC 94 or when the MAX/MIN bit is set LOW and the equalized T1 signal is higher than the reference signal from DAC 94. Additionally, the energizing input to buffer 132 from XOR gate 96 is also applied to a reset input of divide-by-16 circuit 134, so that when relay 130 is deenergized, circuit 134 is reset to begin a string of 16 counts when relay 130 is energized. As with relay 104, relay 130 may be a conventional relay, or a solid state switching device.

In order to generate the control bits POS/NEG, 1/0, and MAX/MIN, which control bits being applied to buffer 108, multiplexer 128, XOR gate 96, and initialization circuit 157, a two bit binary sequencer 138 is used to generate a repetitive, sequential binary two bit count. This count is output on a two line bus 140, and is applied to converters 146–152. These converters each convert the two bit code to a control code, which is applied to a three line bus 154, and wherein the most significant bit (MSB) is the POS/NEG control bit, the next significant bit is the 1/0 control bit, and the LSB is the MAX/MIN control bit. As shown, as the two bit count progresses from 00 to 11, the control bits on bus 154 sequentially configure the circuitry of FIG. 4 to sample the described impairment parameters of the T1 signal. This circuit configuration and sampling, for each impairment parameter, is done for a discrete period of time, as set by time delay 155 coupled to sequencer 138. After time delay 155 times out, it provides a clock pulse to sequencer 138, which steps it to the next binary count. This time delay, for each parameter, is set to allow a sufficient number of equalized T1 signals of interest to pass in order to allow the reference signal from DAC 94 to be stepped to a level indicative of the impairment parameter of interest, and in the present invention, allows about 5000 ONES or ZERO levels to pass.

For initializing the circuit of FIG. 4 prior to measuring an amplitude of each impairment parameter, initialization outputs from each of converters 146–152, each indicating that a conversion has occurred, are conventionally wire-ORd at terminal 153, with this input applied to initialization circuit 157. Additionally, an initialization input from power switch 159 is applied to initialization circuit 157 to initialize the circuit when power is applied thereto. Further, a MAX/MIN input is provided to initialization circuit 157, which is utilized to selectively apply a HIGH or LOW to ATTENUATE/GAIN input 102 of DAC 94. These initialization inputs, when active, generate outputs from initialization circuit 157 that apply a HIGH logic level to ATTENUATE/GAIN input 102 of DAC 94 when maximum ZERO T1 signals are being observed, and a LOW when minimum ONE signals are being observed. Also, the initialization circuit enables a memory register and associated circuitry 159 to load counter 98 with a count of FE hex. This initialization scheme insures that when maximum amplitude signals are observed, the reference signal from DAC 94 always begins at a voltage near 0 volts, and is incremented rapidly upward toward the T1 signal. Conversely, when minimum amplitude signals are being observed, the reference signal is initialized to a high value, about 4.75 volts, and decremented rapidly toward the T1 signal. After the circuit stabilizes from application of the initialization inputs, the initialization inputs are removed, and the circuit is allowed to seek a level of the positive maximum ZERO signals. Upon the second set of control bits being generated by converter 148, the circuit is reinitialized as described, with the count again beginning at FE hex and the reference signal incremented toward a negative maximum ZERO T1 signal. The third and fourth sets of control signals cause counter 98 to be loaded with FE hex, but a LOW is applied to ATTENUATE/GAIN input 102, causing the reference signal to begin at a highest level and be decremented rapidly. Additionally, reset outputs (not shown) may be provided to sequencer 138, receiver 10, and any other components requiring a reset input, as is conventional in the art.

Figure 5:
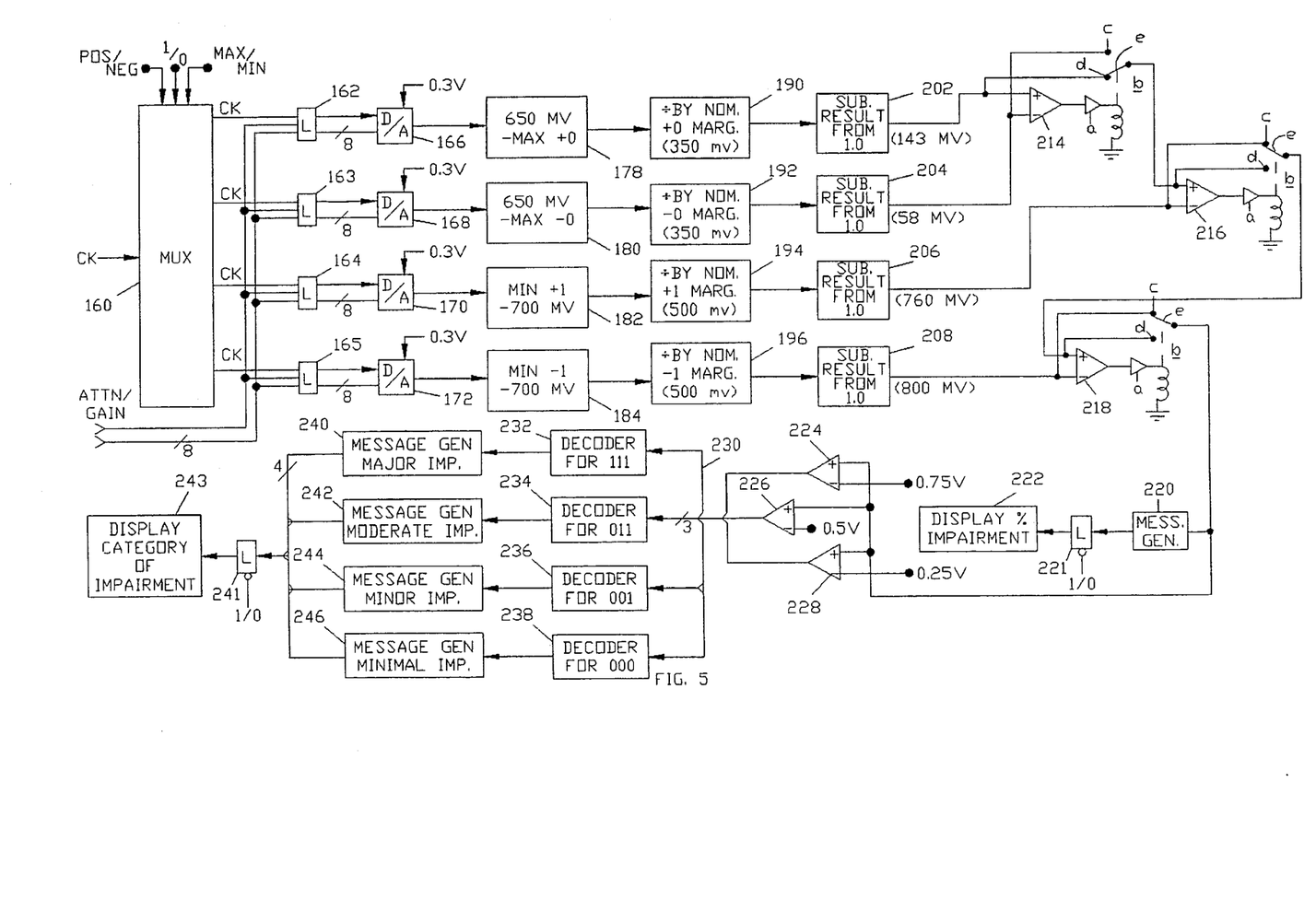
FIG. 5 is a continuation of FIG. 4.

For storing a weighted voltage level of the dithered reference signal for each impairment parameter, reference is made to FIG. 5. Here, the control bits POS/NEG, 1/0, and MAX/MIN from converters 146–152 (FIG. 4) are used to control multiplexer 160, which in turn receives the clock pulse from time delay 155 and enables the appropriate one of latches 162–165 to receive the 8 bit count from counter 98 (FIG. 4) and the ATTENUATE/GAIN output from OR gate 101 until the count and ATTENUATION/GAIN bit for the four impairment parameters are latched. After being latched, each discrete count is applied to one of digital to analog (D/A) converters 166–172, which are logarithmic digital-to-analog converters identical to converter 94 (FIG. 5), and which serve to convert the binary count back to the reference signal voltage. These voltages are then applied to subtraction units 178–184, which for positive and negative ONES, and as processed by units 182 and 184, subtracts the minimum allowable amplitude value for positive and negative ONEs, which is +700 millivolts, from the reference signal voltage. For positive and negative ZERO signal levels, subtraction units 178 and 180 subtract the measured maximum ZERO T1 signals from maximum allowable positive and negative ZERO signal levels, which is +650 and −650 millivolts, respectively. These subtractions obtain voltages representative of margins for positive and negative ONE T1 signal levels and voltages representative of margins for positive and negative ZERO T1 signal levels. As the circuit of FIG. 4 measures only positive T1 voltages, it is noted that negative polarity designations in FIG. 5 serve to identify types of T1 signals and their margins, with actual voltages being of positive polarity.

These voltages from subtraction units 178–184, for each impairment parameter, are discretely applied to division units 190–196, which divide the margin of each impairment parameter by the nominal margin for that type of T1 signal to obtain a voltage representative of a decimal value of the margin of the received T1 signal with respect to a nominal margin. Here, as described, nominal margins for positive and negative logical ONES extend from about 500 to 800 millivolts above the +700 millivolt switching threshold and below the −700 millivolt switching threshold, and nominal margins for ZEROES extend from about 0.0 volts to above and below positive and negative 300 millivolts. Where a measured voltage of a T1 positive or positive representation of a negative ONE signal falls between 1.2 and 1.5 volts, which region being a guard band region which allows for minor signal fluctuations due to minor circuit differences, division units 194 and 196 are configured to clip a portion of the signal extending more than 500 millivolts above the 700 millivolt threshold for a ONE signal. This serves to classify signals falling into the guard band as 0% impaired signals instead of producing negative impairments. Additionally, positive and negative ZERO signals less than 300 millivolts also fall into a similar guard band region, and are offset to 300 millivolts in division units 190 and 192. Next, the decimal values of the margins of the received signals are subtracted from 1.0 volt in subtraction units 202–208, yielding a voltage directly representative of a percentile of impairment. These voltages for the four impairment parameters of the T1 signal are then compared with each other in analog comparator circuits containing comparators 214–218. Each of comparators 214–218 is constructed having an output buffered by a buffer amplifier designated a, with the buffered output coupled to a coil of a relay designated b. Relay b may be a fast acting relay, or a solid state device coupled to function as a relay. Contacts c and d are coupled to non-inverting and inverting inputs of the comparator, respectively, and to outputs of two of subtraction circuits 202–208. Wiper e, when the coil is energized by buffer a, is pulled to contact d, and when the coil is deenergized, the wiper is biased against contact c. The output from wiper e is coupled to a noninverting input of the next comparator. Connected as such, the highest voltage, which is representative of the highest value of impairment, is applied to inputs of comparators 214–218 and passed by wipers e of relays b, and applied to a message generator 220. Generator 220 generates a message that when passed by latch 221 being enabled by transition of the 1/0 control bit from a 1 to 0, displays on display 222 the voltage as a percentile of impairment. As this voltage is directly representative of percentage of impairment, the display may simply be an analog meter with a scale graduated in percentile of impairment, with the scale also indicating categories of impairment, or it may be a digital device, such as an LCD display coupled to a digital message generator which converts the voltage representative of a percentile of impairment to a digital format suitable for the digital display.

In the instance where a digital display is utilized, a category of impairment may be obtained for the voltage provided by comparators 214–218 by applying the voltage to one input of comparators 224, 226, and comparator 228, with the other input of each provided with a voltage representative of an upper limit of a particular category of impairment. Thus, the output of comparator 224 goes HIGH when the voltage representative of the percentile rises above 750 millivolts, the output of comparator 226 goes HIGH when the percentile voltage rises above 500 millivolts, and comparator 228 goes HIGH when the percentile voltage rises above 250 millivolts. The outputs of comparators 224, 226, and 228 form a code wherein comparator 224 outputs the most significant digit, comparator 226 outputs the next significant digit, and comparator 228 outputs the least significant digit. This code is output to a 3 line bus 230, which applies the code from comparators 224, 226, and 228 to decoders 232, 234, 236, and 238. Decoder 232 decodes a 111 output and provides an enabling logic state, for instance a HIGH, to message generator 240, which generates a message of MAJOR IMPAIRMENT, which message being applied to latch 241 which when enabled by the 1/0 control bit transitioning from 1 to 0, displays the message on display 243. Likewise, decoder 234 decodes a 011 and energizes message generator 242, generating a message of MODERATE IMPAIRMENT to be applied to display 243, while message generators 244 and 246 generate messages of MINOR IMPAIRMENT and MINIMAL IMPAIRMENT, respectively, which also may be applied to display 243.

In operation, and referring to FIG. 4, the system is initialized upon power-up by INIT circuit 157 applying an enabling input to register 159, loading a count of FE hex into counter 98, and holding input 102 of DAC 94 HIGH. Also during initialization, divide-by-16 counter 134 is reset to a beginning point of a string of 16 counts. This initialization process resets the reference signal output from DAC 94 to 19.1 millivolts prior to incrementing the reference signal toward an amplitude of the first impairment parameter of maximum positive ZERO. After initialization occurs, sequencer 138 is released to generate the first binary count of 00, which is converted by decoder 146 to control bits 101. The most significant control bit, 1, is applied to the input of relay buffer 108, and to the POS/NEG input of multiplexer 128. This energizes relay 104, applying equalized T1 signals to the noninverting input of comparator 90. The next significant control bit, 0, together with the most significant control bit, 1, is applied to multiplexer 128, configuring it to pass a clock pulse only during positive polarity, ZERO T1 signals. The least significant control bit, 1, is also applied to the MAX/MIN input of XOR gate 96, which will generate a LOW output because the reference signal is initialized at the lowest amplitude of 19.1 millivolts, corresponding to a count of FE hex, with the received T1 ZERO almost always being above this low reference signal. In the event that the T1 ZERO signal is initiated below 19.1 millivolts, the next incrementation would cause FF hex detector to become enabled as described, setting U/D input 110 UP, causing the count to go to FF hex and be dithered as described. This LOW from gate 96 disables relay 130 and biases relay arm 136 to contact 129, applying each clock pulse from multiplexer 128 to counter 98.

At this point, clock pulses are passed to counter 98 only upon occurrence of T1 ZERO, positive amplitude pulses, it being assumed, by way of example, that these T1 pulses are running at an average amplitude generally of +350 millivolts. At approximately a center point, which generally corresponds to a maximum amplitude of the T1 signals, these +350 millivolt, positive ZERO signals, RCK and its inverted, associated signal RD POS and RD NEG applied to AND gate 122 go high, causing only AND gate 122 to develop a HIGH, which high being applied to multiplexer 128. The bit states of POS/NEG and 1/0 applied thereto are such as to enable multiplexer 128 to pass clock pulses only during positive ZERO T1 signals, which are applied to divide-by-16 circuit 134 and to relay contact 129.

With T1 pulses of this average amplitude of about +350 millivolts, comparators 90 and 92 each develop a HIGH output, which when applied to XOR gate 112, cause it to develop a LOW output. This LOW, applied to AND gate 116, causes it to develop a LOW, which is applied to OR gate 103. The other input of gate 103, being LOW, causes OR gate 103 to develop a low output, which is applied to UP/DOWN input 110 of counter 98, setting it to count down from FE hex. The output from comparator 90, a HIGH, is applied to NOR gate 97, causing it to develop a LOW. The output from comparator 92 and 00 hex detector 95, both HIGH, cause AND gate 93 to develop a HIGH, causing OR gate 101 to develop a HIGH. This HIGH is applied to ATTENUATE/ GAIN input 102 of DAC 94, maintaining it in the ATTENUATE mode of operation. With the next decremented count from counter 98, FD hex, the 19.1 millivolt reference signal is incremented by a 0.1 dB step to 19.4 millivolts. Since this tiny increment of the reference signal applied to comparator 90 does not raise the reference signal above the T1 positive ZERO signals of +350 millivolts, the logic states applied to the circuit do not change, and the count applied to DAC 94 continues to be decremented 254 more steps as the next 254 T1 positive ZERO signals occur, raising the reference signal by 0.1 dB step per each positive polarity T1 ZERO signal until the count reaches 00 hex, corresponding to 0 dB attenuation of the 300 millivolt reference voltage applied to DAC 94 and a reference signal amplitude of 300 millivolts applied to comparators 90 and 92. Because the positive polarity T1 ZERO signals of about +350 millivolts applied to comparator 90 are still higher than the reference signal of 300 millivolts, the output of comparator 90 does not change. However, the like voltages applied to the inputs of comparator 92 cause its output to be indeterminate.

In order to continue to increment the reference signal output past 300 millivolts, corresponding to the minimum count of 00 hex, the output of 00 hex detector 95 goes LOW, disabling AND gate 93 and applying a LOW to one input of NOR gate 97. However, since the output of comparator 90 is still HIGH, gate 97 develops a LOW, causing OR gate 101 to develop a LOW. This LOW is applied to ATTENUATE/ GAIN input 102 of DAC 94 via the blocking diode, setting its mode of operation to the GAIN mode. Concurrently, the LOW from 00 hex detector 95 is inverted to a HIGH and applied to OR gate 103, which is enabled to develop a HIGH, which in turn is applied to UP/DOWN input 110 of counter 98. This sets counter 98 to count up from 00 hex, and with DAC 94 in the GAIN mode, causes the reference signal output therefrom to be incremented upward with a 0.1 dB gain to 303.5 millivolts. This causes the output of comparator 92 to develop a LOW, disabling AND gate 93, and with NOR gate 97 generating a LOW due to the HIGH from 00 hex detector 95, OR gate 101 continues to apply a LOW to ATTENUATE/GAIN input 102 of DAC 94. As comparator 90 is now providing a HIGH to AND gate 116 via XOR gate 112, which together with the HIGH from FF hex detector 114, gate 116 provides a HIGH to OR gate 103, enabling gate 103 to continue to apply a HIGH to UP/DOWN input 110 of counter 98. This causes counter 98 to continue counting up from 01 hex, raising the reference signal from DAC 94 until it exceeds the assumed +350 millivolt level of the T1 ZERO signals applied to comparator 90.

Upon occurrence of the reference signal from DAC 94 exceeding a T1 ZERO signal, comparator 90 develops a LOW, which is applied to XOR gate 112, causing it to develop a LOW, which in turn causes AND gate 116 to develop a LOW. This LOW, when applied to OR gate 103 causes it to develop a LOW, which when applied to UP/DOWN input of counter 98, sets it to count down. With the GAIN mode of DAC 94 unchanged by comparator 90 transitioning LOW, the reference signal is set to be decremented 0.1 dB per downward count. Additionally, the LOW from comparator 90 is applied to XOR gate 96, causing it to develop a HIGH output, which enables divide-by-16 circuit 134 to count, and also energizes the coil of relay 130. As such, the clock pulses from multiplexer 128, which occur only with T1 ZERO signals, are divided by 16, applying every 16th clock pulse to counter 98. Thus, 16 T1 ZERO signals of lower amplitude than the reference signal, and their clock pulses, occur before the reference signal from DAC 94 can be decremented a 0.1 dB step. As stated, this causes the reference signal to be incremented rapidly to a value of the maximum amplitude of the T1 ZERO pulses, while allowing only a slow decay or decrementing of the reference signal in order to provide an impairment value of the T1 ZERO signals weighted toward the maximum amplitude of the ZERO signals and to provide buffering against transient reductions of the T1 signal. If, upon allowing the reference signal to decay a 0.1 dB step, it is now below the T1 ZERO signal, relay 130 is reset, and U/D input 110 receives a HIGH, allowing the next clock pulse to increment the reference signal a 0.1 dB step. This dithering process of rapid incrementing and slow decay of the reference signal continues until time delay 155 times out, at which time amplitude of the weighted, dithered reference signal is stored, as will be described in detail hereinafter.

After time delay 155 times out, which allows time for the reference signal to be incremented to a point where it is being dithered at a weighted value of maximum positive T1 ZERO signals, time delay 155 provides a clock pulse to enable storing of the weighted value for maximum positive ZERO, and sequencer 138 is clocked to produce the next binary value of 01, which is converted by decoder 148 to control bits 001. Concurrently, an output from decoder 148 provides an initialization signal to initialization circuit 157, which again loads FE hex into counter 98 and holds the ATTENUATE/GAIN input HIGH. These control bits configure the circuitry of FIG. 4 for observing and measuring the impairment parameter of maximum negative ZERO, with a LOW applied to the POS/NEG input of buffer 108 and multiplexer 128, a LOW applied to the 1/0 input of multiplexer 128, and a HIGH applied to the MAX/MIN input of XOR gate 96. Configured as such, relay 104 is deenergized, applying inverted T1 signals, which include positive representations of negative T1 signals, from analog inverter 111 to the circuit via contact 107, multiplexer 128 is set to pass clock pulses upon occurrence of a negative T1 ZERO signal, and both inputs of XOR gate 96 are set HIGH, which sets the circuit so that the reference signal quickly seeks a maximum amplitude and decays to lower amplitudes slowly. Operation of the circuit to measure maximum amplitudes of negative T1 ZERO signals is also as described for positive T1 ZERO signals, with the exception that relay 104 is deenergized and multiplexer 128 passes a clock pulse only for negative T1 ZERO signals. It is assumed by way of example that the stored reference signal for negative ZERO T1 signals is −320 millivolts.

After time delay 155 again times out, storing the dithered value for maximum negative ZEROES, sequencer 138 is clocked to generate the next binary code of 10. This is converted to control bits 110, which configures the circuit to measure minimum amplitudes of positive T1 signals. The count of FE hex is loaded into counter 98, and the LOW MAX/MIN bit applied to initialization circuit 157 causes the ATTENUATE/GAIN input to be initialized LOW, with a corresponding reference signal output from DAC 94 set at 4.7 volts. With these settings for the control bits, a HIGH is applied to buffer 108, setting relay 104 to apply positive T1 signals to the circuit of FIG. 4. Additionally, the HIGH POS/NEG control bit is applied to multiplexer 128 along with a HIGH 1/0 control bit. The LOW MAX/MIN control bit is applied to XOR gate 96. After initialization, the circuit is released, and assuming degraded positive T1 signal of a value of about +820 millivolts, comparators 90 and 92 each develop a LOW output. In turn, XOR gate 112 develops a LOW, causing gate 116 also to develop a LOW. This LOW is applied to OR gate 103, which together with the LOW from inverter 99, causes OR gate 103 to apply a LOW to UP/DOWN input 110 of counter 98. Counter 98 is thusly set to count down. The LOW from comparator 90 is applied to NOR gate 97, which together with the HIGH from 00 hex detector 95, causes gate 97 to apply a LOW to OR gate 101. The LOW from comparator 92 applied to AND gate 93 also causes it to develop a LOW, which in turn causes OR gate 101 to apply a LOW to ATTENUATE/GAIN input 102 of DAC 94, causing it to operate in the GAIN mode of operation. Additionally, as MAX/MIN applied to XOR gate 96 is LOW and the output of comparator 90 is LOW, the output of XOR gate 96 is LOW, deenergizing relay 130, resetting divide-by-16 circuit 134 and causing each clock pulse from AND gate 124 applied to multiplexer 128 to be applied to counter 98. As such, with each successive downward count, the reference voltage will be decremented toward the average +820 millivolt level of the minimum T1 positive ONES.

As the reference signal drops below a minimum amplitude of a T1 positive ONE, comparator 90 develops a HIGH, which causes XOR gate 112 to develop a HIGH output, which enables AND gate 116. Gate 116 in turn applies a HIGH to OR gate 103, which also goes HIGH, applying the HIGH to UP/DOWN input 110 of counter 98 and causing counter 98 to count up. As NOR gate 97 continues to develop a LOW due to the HIGH from 00 hex detector 95, and gate 93 is still LOW, OR gate 101 is maintained LOW, keeping operation of DAC 94 in the GAIN mode. The HIGH from comparator 90 is also applied to XOR gate 96, and since MAX/MIN is LOW, the output of XOR gate 96 transitions HIGH. This energizes relay 130 and enables divide-by-16 circuit 134 to provide slow incrementing of the reference signal, with a 0.1 dB incrementation thereof occurring only after 16 higher-in-amplitude positive T1 signals occur. As such, the circuit begins to dither the count as described at a value weighted toward a minimum amplitude T1 positive ONE, after which timing circuit 155 times out, enabling latching of the T1 positive ONE and allowing sequencer 138 to generate the last binary sequence of 11, which sequence being converted to control bits 010 by decoder 152.

The control bits 010, which configure the circuit to seek a minimum amplitude of negative ONES, cause a LOW to be applied to buffer 108 and to the POS/NEG input of multiplexer 128, a HIGH to the 1/0 input of multiplexer 128, a LOW to the MAX/MIN input of XOR gate 96, and a LOW to the MAX/MIN input of initialization circuit 157. These control bits initialize the circuit by loading FE hex into counter 98 as described, and hold ATTENUATE/GAIN input 102 of DAC 94 LOW so the reference signal output is at a high value of 4.7 volts, with a downward count rapidly decrementing the reference signal. Operation is as described above for minimum amplitude positive ONES, with the exception that buffer 108 is deenergized, applying positive representations of the negative T1 signals to comparator 90. Also, the 1/0 control bit applied to multiplexer 128 is HIGH, allowing clock pulses from AND gate 126 to be passed by multiplexer 128 only during T1 negative ONE signals. It is assumed by way of example that the degraded amplitudes of the T1 negative signals is about −800 millivolts.

The counts representative of each of the dithered reference signals of +350 millivolts, −320 millivolts, +820 millivolts and −800 millivolts, and a respective ATTENUATION/GAIN control bit for each count, are applied simultaneously to latches 162–165, which latches being clocked by a steered clock signal from multiplexer 160. Multiplexer 160 is in turn controlled by control bits POS/NEG, 1/0, and MAX/MIN, to steer the clock pulses as they occur from time delay 155 to the appropriate one of latches 162–165. These latches provide the count and ATTENUATE/GAIN bit to a respective one of DACs 166–172, which convert the count and ATTENUATE/GAIN bit back to the reference signal voltage. As such, DAC 166 provides a voltage of +350 millivolts, DAC 168 provides a voltage of +320 millivolts, DAC 170 provides a voltage of +820 millivolts, and DAC 172 provides a voltage of +800 millivolts. As indicated, these voltages are measurements of maximum amplitude T1 positive ZERO signals, maximum amplitude T1 negative ZERO signals, minimum amplitude T1 positive ONE signals, and minimum amplitude T1 negative ONE signals, respectively.

For T1 ZERO signals, the measured values are subtracted from 650 millivolts, the maximum ZERO signal value, in subtraction circuits 178 and 180 to obtain margin values of 300 millivolts for maximum positive ZEROES and 330 millivolts for maximum negative ZEROES. These actual margins are then divided by the nominal margins for positive and negative T1 ZEROES, respectively, which is 350 millivolts, in division units 190 and 192 to obtain voltages of 857 millivolts for the positive T1 signals and 942 millivolts for the negative T1 signals, these voltages being decimal indications of the T1 margins with respect to the nominal T1 margins. These decimal indications are then subtracted from 1000 millivolts, which is representative of 100%, obtaining voltages of 143 millivolts, which is representative of 14.3% impairment for the positive ZERO T1 signals and a voltage of 58 millivolts for negative T1 signals, in turn representative of 5.8% impairment for negative T1 signals.

Treatment of the measured values of minimum positive and negative ONES is similar, with DACs 170 and 172 receiving the latched count and ATTENUATION/GAIN input from latches 164 and 165, respectively. The count is converted to a voltage, in this case, back to the measured 820 millivolts and 800 millivolts, and applied to subtraction circuits 182 and 184. Here, the minimum allowable values for positive and negative ONES, or 700 millivolts, is subtracted from the positive and negative T1 reference signals from DACs 166 and 168 to obtain margin values of 120 millivolts and 100 millivolts, respectively. These voltages are then applied to division units 194 and 196, which divide these voltages by the nominal margins for the T1 positive and negative ONES, which is 500 millivolts. This yields decimal values of 240 millivolts for positive ONES, and 200 millivolts for negative ONES. These decimal values are then applied to subtraction units 206 and 208, which as described, subtract the decimal value from 1000 millivolts, representative of 100%, obtaining values of 760 millivolts and 800 millivolts, which are direct percentile indications of 76.0% impairment of positive ONES and 80.0% impairment of negative ONES.

For isolating the highest values of impairment, the voltage of 143 millivolts from subtraction circuit 202 and 58 millivolts from subtraction unit 204 are applied to comparator 214. Here, as the higher 143 millivolt potential is applied to the noninverting input of comparator 214, the output thereof is HIGH, which energizes relay b and moves relay arm e to contact d, which applies the higher potential of 143 millivolts to the noninverting input of comparator 216. Here, the 143 millivolts from relay b is compared with 760 millivolts from subtraction circuit 206, causing comparator 216 to develop a LOW, applying the 760 millivolt potential via deenergized relay b to the noninverting input of comparator 218. The inverting input of comparator 218 has 800 millivolts from subtraction circuit 208 applied thereto, causing comparator 218 to develop a LOW, deenergizing relay b and applying the 800 millivolt potential to message generator 220. As the 1/0 control bit transitions from HIGH to LOW, latch 221 is enabled to display the message of 80% impairment.

For determining a category of impairment, the 800 millivolt potential is applied to the noninverting inputs of comparators 224, 226, and 228, which each have reference voltages of 750 millivolts, 500 millivolts, and 250 millivolts, respectively, applied to inverting inputs thereof. As such, the comparators will all develop a HIGH output, which enables decoder 232 to develop an enabling output to message generator 240. As with latch 221, latch 241 is enabled to pass the message of MAJOR IMPAIRMENT to display 243 as the 1/0 control bit transitions from a HIGH to a LOW state.

While this system is shown in context of a T1 signal line and T1 signal, it is by no way intended to be limited thereto, and may be adapted to a variety of types of signal transmission lines and signal transmission protocols.

Having thus described our invention and manner of its operation and use, it is apparent that incidental modifications may be made thereto without departing from the scope of the following appended claims, wherein we claim:

1. A system for monitoring communications signals comprising:

signal discrimination means responsive to communications signals, for separately providing at least one value indicative signal responsive to, and representative of, values of at least one discrete characteristic type of communications signal;

at least one degraded signal detection means including signal generating means for generating a variable value reference, and driving means responsive to a said value indicative signal for driving said signal generating means, and thereby a value of said variable value reference toward a value of a said discrete characteristic type of communications signal, said driving means being most responsive to said value indicative signal which is of a value indicative of a greater degradation than a value of said variable value reference; and at least one reference comparison means responsive to said variable value reference resulting from said discrete characteristic type of communications signal, and a discrete nominal signal value for providing an output indicative of a degree of impairment of said characteristic type of communications signal.

2. A system as set forth in claim 1 wherein said signal discrimination means includes means responsive to positive and negative HIGH logic signals, for providing, respectively, discrete value indicative signals separately representative of a first, HIGH positive logic, said characteristic type, and a second, HIGH level negative logic, said characteristic type.

3. A system as set forth in claim 1 wherein said signal discrimination means includes means responsive to positive and negative LOW logic signals, for providing, respectively, discrete value indicative signals representative of (1) a LOW level positive said characteristic type and (2) a LOW level negative said characteristic type.

4. A system as set forth in claim 1 comprising:

a first said signal discrimination means for providing at least one first value indicative signal representative of HIGH logic signals;

a second said discrimination means for providing at least one second value indicative signal representative of LOW logic signals;

said degraded signal detection means comprising:

first said degraded signal detection means responsive to said first value indicative signals, including first signal generating means for generating a first variable reference and first driving means for driving said first signal generating means, and thereby said first variable reference, toward a value of said first value indicative signals, being most responsive in drive when said first variable reference is greater in value than the value of said first value indicative signals, and second said degraded signal detection means responsive to said second value indicative signals, including second signal generating means for generating a second variable reference and second driving means for driving said second signal generating means, and thereby said second variable reference, toward a value of said second value indicative signals, being most responsive in drive when said second variable reference is less in value than the value of said second value indicative signals;

said reference comparison means comprises:

first comparison means responsive to a said first variable reference resulting from said HIGH logic signals, and a nominal HIGH logic level signal, for providing a first comparison signal output representative of a degree of signal impairment of said HIGH logic signals, and second comparison means responsive to a said second variable reference resulting from said LOW logic signals, and a nominal LOW logic signal, for providing a second comparison signal output representative of a degree of impairment of said LOW logic signals; and indication means responsive to said first and second comparison means, for indicating a degree of impairment of a selected one of said value indicative signals.

5. A system as set forth in claim 1 further including means coupled to a communications circuit for providing said communications signals.

6. A system as set forth in claim 4 including means for storing said first and second comparison signal outputs, and said indication means includes means responsive to stored said comparison signal outputs for indicating the greatest impairment of said communications signals.

7. A method for providing an indication of impairment of a communications signal on a signal line comprising the steps of:
(1) receiving communications signals which include intelligence signals from said signal line,
(2) selecting like coded portions of said intelligence signals from at least one sequence of said communications signals,
(3) comparing said like coded portions as they occur in said sequence to a reference signal,
(4) varying amplitude of a said reference signal such that it is in converging relation with respect to intelligence signals evidencing degradation in amplitude, and more greatly favoring convergence toward said intelligence signals evidencing greatest degradation in amplitude of said intelligence signals during a said sequence, and
(5) comparing the amplitude of said reference signal with amplitudes of a nominal signal for providing an indication of impairment of said communications signals.

8. A method as set forth in claim 7 wherein step 4 further includes the step of closely matching amplitudes of said reference signal to amplitudes of those said intelligence signals in each said sequence having a greatest degree of degraded amplitude characteristics while being selectively responsive in matching to those said intelligence signals having lesser degree of said degraded amplitude characteristics.

9. A method as set forth in claim 8 further comprising the steps 1–4 separately for each of a plurality of different like coded portions and selecting the reference signal exhibiting the greatest degree of degraded amplitude characteristics.

10. A method as set forth in claim 9 wherein said different like coded portions are: positive HIGH logic signals, positive LOW logic signals, negative HIGH logic signals, and negative LOW logic signals.

11. A method as set forth in claim 10 wherein each said different like coded portions are selected from a different said sequence.

12. A method as set forth in claim 7 wherein step 4 further comprises the step of varying an amplitude of said reference signal by a selected amplitude for each occurrence of a one of said intelligence signals evidencing a greater degree of degraded amplitude characteristics than said reference signal, and varying said reference signal by a selected amplitude for a discrete multiple of said intelligence signals evidencing a lesser degree of degraded amplitude characteristics than said reference signal, whereby an amplitude of said reference signal is weighted toward those said intelligence signals in each said sequence having the greatest degradation in amplitude.

13. A method for inferring quality of a communications signal line as set forth in claim 12 further comprising the step of dithering said reference signal at an amplitude representative of a greatest degree of intelligence signal degradation by varying an amplitude of said reference signal once toward a more degraded amplitude for each occurrence of a said intelligence signal having a more degraded amplitude than said reference signal, and allowing approximately 16 said intelligence signals having lesser amplitude degradation than an amplitude of said reference signal to occur before said reference signal is varied once toward said lesser amplitude degradation.

14. A method for providing an indication of the condition of impairment of a communications signal on a signal line comprising the steps of:
(1) receiving communications signals which include intelligence signals from said signal line;
(2) selecting like coded portions of said intelligence signals from at least one sequence of said communications signals;
(3) comparing said like coded portions as they occur in said sequence to a reference signal;
(4) varying the amplitude of a said reference signal by a selected amplitude of each occurrence of a said intelligence signal, evidencing a greater degree of degraded amplitude characteristics than said reference signal, and varying said reference signal by a selected amplitude for a discrete multiple of said intelligence signals, evidencing a lesser degree of degraded amplitude characteristics than said reference signal, weighing said reference signal toward those intelligence signals in each said sequence having the most degraded amplitudes; and
(5) comparing the amplitude of said reference signal with the amplitudes of a nominal signal for providing an indication of impairment of said communications signals.

15. A method as set forth in claim 14 wherein step 4 further includes the step of closely matching amplitudes of said reference signal to amplitudes of those said intelligence signals in each said sequence having a greatest degree of degraded amplitude characteristics while being selectively less responsive in matching to those said intelligence signals having lesser degree of said degraded amplitude characteristics.

16. A method as set forth in claim 15 further comprising the steps 1–4 separately for each of a plurality of different like coded portions and selecting the reference signal exhibiting the greatest degree of degraded amplitude.

17. A method as set forth in claim 16 wherein said different like coded portions are: positive HIGH logic signals, positive LOW logic signals, negative HIGH logic signals, and negative LOW logic signals.

18. A method as set forth in claim 17 wherein each of said different like coded portions are selected from a different said sequence.

19. A method for inferring the quality of a communications signal line as set forth in claim 18 further comprising the step of dithering said reference signal at an amplitude representative of a greatest degree of intelligence signal degradation by varying an amplitude of said reference signal once toward a more degraded amplitude for each occurrence of a said intelligence signal having a more degraded amplitude than said reference signal, and allowing approximately 16 said intelligence signals having lesser amplitude degradation than an amplitude of said reference signal to occur before said reference signal is varied once toward said lesser amplitude degradation.

* * * * *